United States Patent [19]

Dutta et al.

[11] Patent Number: 5,175,942
[45] Date of Patent: Jan. 5, 1993

[54] METHOD FOR FLUIDIZED BED DISCHARGE

[75] Inventors: Arunava Dutta, Chestnut Hill; Leonard V. Dullea, Peabody; Ernest A. Dale, Hamilton, all of Mass.

[73] Assignee: GTE Products Corporation, Danvers, Mass.

[21] Appl. No.: 732,980

[22] Filed: Jul. 19, 1991

[51] Int. Cl.⁵ .............................................. F26B 3/08
[52] U.S. Cl. ........................................ 34/10; 427/213; 118/303; 118/DIG. 5; 422/143; 422/145
[58] Field of Search .................. 427/213; 118/62, 303, 118/DIG. 5; 422/139, 143, 144, 145; 34/57 A, 10; 432/15, 58

[56] References Cited

U.S. PATENT DOCUMENTS

| | | | |
|---|---|---|---|
| 2,874,950 | 2/1959 | Pyzel | 432/15 |
| 4,023,280 | 5/1977 | Schora et al. | 422/145 |
| 4,217,127 | 8/1980 | Kono et al. | 118/DIG. 5 |
| 4,330,502 | 5/1982 | Engström | 422/143 |
| 5,082,634 | 1/1992 | Raufast | 422/143 |

FOREIGN PATENT DOCUMENTS 2133716 8/1984 United Kingdom ................ 422/144

OTHER PUBLICATIONS

Webster's new Collegiate Dictionary, G. & C. Merriam, Springfield, Mass. (1961) pp. 621 and 627.

Primary Examiner—Shrive Beck
Assistant Examiner—Terry J. Owens
Attorney, Agent, or Firm—Robert E. Walter

[57] ABSTRACT

In a method of operating a fluidized bed, gas under pressure is distributed into the bed through a gas permeable member extending transverse to the bed and a gas permeable wall of a discharge conduit wherein the relative permeability of the gas permeable member and the conduit is selected so as to obtain a desired distribution of gas entering the bed and a desired effect on the fluidization pattern in the bed.

15 Claims, 7 Drawing Sheets

METHOD FOR FLUIDIZED BED DISCHARGE

FIELD OF THE INVENTION

This invention relates in general to a method of operating a fluidized bed and the discharge of particulate material from the bed.

BACKGROUND OF THE INVENTION

Fluidized beds have gained significant importance in the field of gas-solid contacting. They are being used for a wide variety of uses. For instance, in the chemical vapor deposition of a protective coating on particles of phosphor as disclosed in U.S. Pat. No 4,585,673 to Sigai, it is desirable to control the powder movement and temperature within the fluidized bed. U.S. Pat. No. 4,979,830 to Munn discloses a method for adjustably controlling the rate of circulation and temperature gradient in a fluidized bed. U.S. Pat. No. 4,990,371 to Dutta et al. describes a process for fluidizing small particulate solids and at least partially enveloping the solids with a coating material in a cross-current multi-stage fluid bed reactor.

Fluid bed processes are operated either in a batch or continuous fashion. In a batch process, the entire product remains in the reactor or vessel for withdrawal at the end of the run. In a continuous process, the inventory of material in the reactor is usually a small fraction of the through-put and the withdrawal of solids is continuous.

In batch type processes, the reactor is often inverted to dump the powder. While this may be possible in a laboratory sized fluid bed, this is an impractical and dangerous operation for a pilot or production unit. As a result, a smooth walled discharge tube is often attached to the distributor plate at the bottom of the reactor for withdrawing processed powder by gravity at the end of a batch run. This tube is typically closed by a valve or a plug during the run, and is opened for product removal at the end of the run.

Disadvantages are attendant with the use of a smooth walled discharge tube. The powder in the tube is not fluidized during the fluidization of the bed. At the end of the run, the unfluidized powder is mixed in with the fluidized powder. The tube, which blocks the upward flow of gas, forms a stagnant zone which does not undergo the same fluidization conditions as the powder in the reactor. These conditions can cause product nonuniformity at the end of the run.

When cohesive powders, such as lamp phosphors, are utilized, the problems attendant with smooth tubes are amplified. Bridging of the powder particles frequently results in a slow discharge or even the stoppage of powder flow. This problem may sometimes be overcome by increasing the diameter of the tube. The stagnant zone in the fluid bed, however, is enlarged: no fluidizing gas enters the region of the reactor immediately above the tube. Additionally, the amount of unfluidized powder in the tube dramatically increases with the size of the tube since the volume of material in the tube increases as the square of the tube diameter.

In continuous type fluid bed processes, the withdrawal of cohesive powders may be achieved by pneumatic conveying via a flexible hose located in or above the fluidized bed. The suction necessary for the powder removal may be provided either by a blower or by an eductor. However, with this solution to the powder withdrawal problem, difficulties are encountered. Static electricity build up on the hose may reduce powder flow. Since pneumatic systems for fine particles need a gas-solid filtration system at the downstream end of the hose, additional capital expenditure is necessary to achieve high powder capture efficiencies.

Continuous type processes may also use overflow weirs on the walls of the reactor. While weirs are suited for product transfer across the top of fluid beds, unlike the previous three methods, they cannot be used for draining the inventory of a fluid bed.

Heretofore, difficulties have been encountered in maintaining desired flow of particles during the fluidization process and withdrawal of particles from the bed.

SUMMARY OF THE INVENTION

The present invention is an improvement to the techniques described above. Advantageously, material in the product discharge tube may be contacted with a fluidizing gas. Introduction of fluidizing gas into the discharge tube reduces or eliminates the stagnant zone. Hence, the resulting powder has more uniform product characteristics. The present invention enhances powder withdrawal from the bed with either a gravity drainage system or a pneumatic conveying system. Additionally, processing flexibility is enhanced due to improved control of particle flow during fluidization and discharge. Various fluidization patterns such as uniform flow, spouting and Gulf Streaming behavior may be achieved during the fluidization process. Uniform flow refers to approximately uniform distribution of gas between the discharge tube and the distributor plate. Spouting, observed only in very large sized powders, occurs when most of the gas enters the fluid bed through the discharge tube. Gulf streaming occurs when most of the fluidizing gas enters through the distributor plate.

In accordance with the present invention, there is provided a method of fluidizing particles in a vertically extending bed of particles where upwardly flowing gases are introduced into a bottom portion of the bed for fluidizing the particles. One portion of the upwardly flowing gas is distributed under pressure into the bed through a gas permeable member extending transverse to the bed. Another portion is distributed into the bed through the central opening of a conduit. The conduit has a gas permeable wall permitting the flow of gas into the central opening. By selecting the distribution of upwardly flowing gases between the conduit and the gas permeable member, a desired effect on the movement of particles in the bed is achieved. A valve means operably associated with the conduit is in a normally closed position for preventing the discharge of particles from said bed during fluidization and is in an open position for discharging particles from the bed through the central opening of said conduit. During discharge gas flowing into the conduit through the gas permeable wall enhances the withdrawal of particles.

The present invention allows continuous interchange of powder between the bed and the product discharge tube. The common problem of unfluidized material in the product withdrawal tube during processing is thereby reduced. The usual contamination of desired product by partially reacted material is avoided, leading to improved product quality.

By changing the permeability and dimensions of the tube with respect to the distributor plate, different fluidizing patterns may be produced in the bed. These patterns may be classified as uniform, Gulf Streaming and spouting. In addition, the gas flow through the gas permeable tube aerates the powder allowing a very efficient exit of material through the discharge conduit to the collection unit at the end of the run. Lack of aeration in existing designs often causes flow problems when handling cohesive materials such as reprographic toners, talc, phosphors, etc.

The present invention provides for contacting the material being withdrawn with a gas to enhance the flow of powder. This contacting reduces the flow problems associated with the transport of cohesive powders of Geldart Type C.

Additional objects, advantages and novel features of the invention will be set forth in the description which follows, and in part will become apparent to those skilled in the art upon examination of the following or may be learned by practice of the invention. The aforementioned objects and advantages of the invention may be realized and attained by means of the instrumentalities and combination particularly pointed out in the appended claims.

BRIEF DESCRIPTION OF THE DRAWINGS

The invention will become more readily apparent from the following exemplary description in connection with the accompanying drawings, wherein.

BEST MODE FOR CARRYING OUT THE INVENTION

For a better understanding of the present invention, together with other and further objects, advantages and capabilities thereof, reference is made to the following disclosure and appended claims in connection with the above-described drawings.

Figure 1:
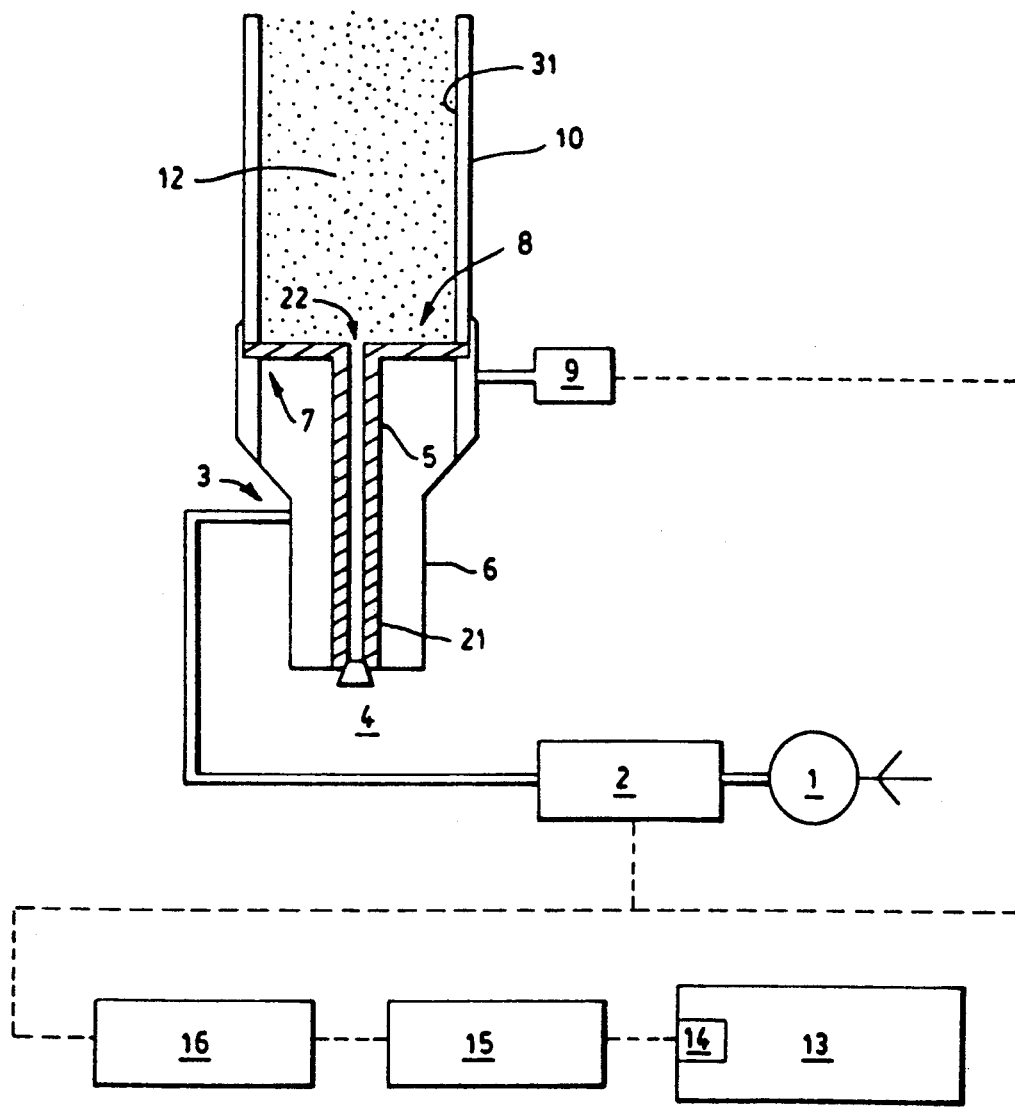
FIG. 1 is a partial cross-sectional side elevation view illustrating in schematic form the fluidized bed and associated apparatus.

As set forth in FIG. 1, the following reference numbers are utilized to designate the following general parts. Upwardly flowing gases are introduced into a bed 12 of particles at a bottom portion through a distributor. The distributor for fluidizing gases includes a conduit 5 and a gas permeable member or plate 8 extending transversely of the bed 12. The gas permeable conduit 5 has a gas permeable wall 21 which permits the flow of gas from the plenum 6 into an axially extending central opening 22. Substantially the entire widthwise extent of the bed 12 is subjected to the upward flow of gas under pressure. The distributor includes an enclosure or plenum 6 which contains gas under pressure and is in communication with the conduit 5 and the gas permeable member 8. The conduit 5 communicates with the fluidized bed 12 at one end for both the flow of gases into the bed 12 and the removal of powder. A valve means 4 is operably associated with the other discharge end of the conduit 5. When the valve 4 is in a closed position, such as during operation of the bed 12 during a batch type process, particles are prevented from exiting the bed 12. One portion of the upwardly flowing gas is distributed into the bed 12 from the conduit 5 and another portion is directed through gas permeable member 8. When the valve 4 is opened, gases passing through the gas permeable wall 21 enhance the discharge of particles through the conduit 5.

The cylindrically shaped wall 21 of conduit 5 is gas permeable stainless steel. The transversely extending gas permeable member 8 is preferably of a similar material. The permeability of the wall 21 and member 8 is due to pores which are referred to in terms of the average pore size as given in microns. Due to forming techniques, the pores define a tortuous path through the wall 21 of the conduit 5 or gas permeable member 8. The wall 21 of the conduit 5 is typically about one eighth of an inch in thickness, while the thickness of member 8 is typically 0.059 inch. The material is commercially available from Mott Metallurgical Corporation of Farmington, Conn. The material of construction is SS316. Other possible materials of construction are SS304, SS347, SS430, nickel, Monel (TRADEMARK), Inconel (TRADEMARK), Hastelloy (TRADEMARK), etc. A description of the manufacturing process may be found in Mott Catalog #1000B. The gas permeable material is available in the form of tubes and plates of various permeabilities.

The permeability of a material is the flow (gas) rate per unit of surface area per unit of pressure differential across the medium. In order for a porous material to be gas permeable, at least some fraction of the pores should interconnect and should lead from one surface to the other. Pores which originate and terminate within the pore structure, or blind pores, do not contribute anything to the permeability.

Fluidizing gas passes through a pressure regulator 1 and a mass flow controller 2 through a passage connected to plenum 6. The plenum 6 is connected to and communicates with an elongated vessel 10 having an interior side wall 31 through the gas permeable member 8. A flange on the plenum 6 secures the gas permeable member 8 in position. The gas permeable conduit 5 which may be welded to the gas permeable member 8 extends downwardly along a central axis and through the plenum 6. The plenum 6 has a generally cylindrically shaped configuration and is connected to the discharge end of the conduit 21. Gas under pressure may freely pass into the bed through both the gas permeable member 8 and the gas permeable conduit 5. In FIG. 1, the valve 4 is in the form of a simple plug. It is also contemplated that other valves may be utilized.

The permeability and dimensions of the conduit 5 and the gas permeable member 8 determine the fluidizing pattern in the bed during processing. Various patterns of solid circulation may be achieved by varying the proportion of gas flow between the gas permeable member 8 and the gas permeable conduit 5. Depending on the type of powder being processed, different patterns of flow may be desirable.

To implement fluid bed-chemical vapor deposition coatings according to U.S. Pat. No. 4,825,124 to Sigai et al., the phosphor powder particles must be fluidized. Phosphor powders having an average particle size range of about 20 microns and larger can be fluidized with little difficulty. Difficulty is encountered, however, in fluidizing fine phosphor powders, i.e., phosphor powders with particles having an average particle size of less than about 20 microns. The difficulty in fluidizing the particles of fine phosphor powder arises from interparticle adhesive forces which cause agglomeration and bridging between agglomerates. Such agglomeration and bridging may result in the formation of channels through the bed thereby causing the gas to pass through the channels without fluidizing the particles. Under these circumstances, there is little or no powder bed expansion. Particles of fine phosphor powders, such as cool white halophosphate phosphors, willemite, and other lamp quality phosphors which fall within class "C" of the Geldart Classification Scale, can be fluidized according to the techniques of the present invention.

In accordance with one method of the present invention, the gas velocity at the exit of the conduit 5 is at a comparable rate to the gas velocity at the exit of the gas permeable member 8. In this case, the distribution of gas velocities across the width of the fluid bed is substantially uniform. According to a different method of operation, a spouted bed is created. To facilitate the downward motion of solids to the boundary between the annulus and the spout, the gas permeable member 8 may slope downwardly from the junction with the side wall 31 of the elongated vessel or column 10 to the junction with the conduit. The permeability of the conduit 5 is adjusted relative to the permeability of the gas permeable member 8 so that a major portion of gas flows into the bed 12 from the conduit 5 and a minor portion flows through the gas permeable member 8. Such a gas flow distribution may cause a spouting action which may be beneficial in the gas-solid contacting of large particles because high heat and mass transfer coefficients can be realized. A spouted bed is also favored in the handling of sticky materials because the high shear at the interface of the spout and the annulus can break up clumps of particles.

According to another method of operation, a fluidization pattern may have the velocity at the gas permeable member 8 greatly exceeding that at the exit of the conduit 5. According to this pattern, called Gulf Streaming, dual circulation cells are induced in the bed 12. The direction of solids circulation is from the side walls 31 of the elongated vessel 10 to the center of the bed 12. This technique may be utilized to obtain good mixing of solids where input streams are being introduced at different bed locations.

DETAILED EXAMPLES

Referring to FIG. 1, the experimental setup used to perform the experimental tests described herein is illustrated. Fluidizing air was fed through a pressure regulator 1 and through a PFD 301 mass flow controller through a passage 3 connected to plenum 6. The plenum 6 is connected to and communicates with vessel 10 for the flow of fluidizing gas. The vessel or column 10 is a cylindrical PYREX glass tube about 1.78 meters in height and having a central axis. The member 8 is a circular permeable plate aligned perpendicular to the central axis and connected between the plenum 6 and the column 10. The plate 8 is a 5 micron pore size SS 304 disc. A flange on the plenum 6 secures the plate in position. Attached to the plenum 6 was a Heise model 620 optical pressure transducer 9 with a range of 0 to 12,291.2 Pa gauge pressure (0 to 50 inches H2O gauge pressure). The output of this transducer 9 is 0 to 5 V in this pressure range. The flow controller 2 and the transducer 9 were interfaced using Metrabyte I/O boards, to an IBM 7531 computer 13 for real time data acquisition of qas flow rate and plenum pressure. As illustrated, the electrically connected controls included an Analog to Digital Board, DAS8 at 14, an expansion Multiplexer, EXP 16 at 15, and a screw terminal Board, STA08 at 16.

The conduit 5 is a seamless stainless steel, type 304, gas permeable tube centrally welded to the plate 8. The bed cross sectional area is 78.06 cm$^2$. This is the total area available for the flow of gas in the fluid bed. The area of cross section of the distributor plate is 73 cm$^2$. This is the area available for the gas flowing through the plate to the fluid bed. The external curved surface area of the tube is 120.35 cm$^2$. This is the immediate area available for gas flowing through the tube into the fluid bed. The valve 4 is a rubber stopper, removed for emptying of the bed.

The powder being fluidized is a cool white halophosphate phosphor with a volume average diameter (measured by laser diffraction) of 14.7 um and a density of 3100 kg/m$^3$. The Hausner Ratio of this material is 1.69. The phosphor was blended, prior to fluidization, with 0.35% of AEROSIL 200, a fluidizing aid. The Hausner Ratio of the blend was 1.45.

Two grades of permeability of the conduit were investigated by choosing two different average pore sizes: 100 micron and 2 micron. These configurations are numbered 2 and 3 respectively. Configuration 1 is the current state of the art distributor: a central smooth non-porous tube connected to a porous horizontal plate 8. The permeability of the plate was kept the same in all three configurations, by using the same average pore size material: 5 microns. In Configuration 1, illustrative of the prior art, the conduit 5 is solid so gas does not flow through the walls.

RESULTS AND DISCUSSION

We shall first consider the situation where the system does not have any powder. There is no pressure gradient in the plenum because of the small volume of the plenum chamber. The plenum is, therefore, characterized by a single pressure at any time. One can then speak of a uniform pressure drop across the height of the distributor tube, this pressure drop being numerically equal to that existing across the distributor plate. This uniform pressure drop will be referred to as the distributor pressure drop, $\Delta P$.

Figure 2:
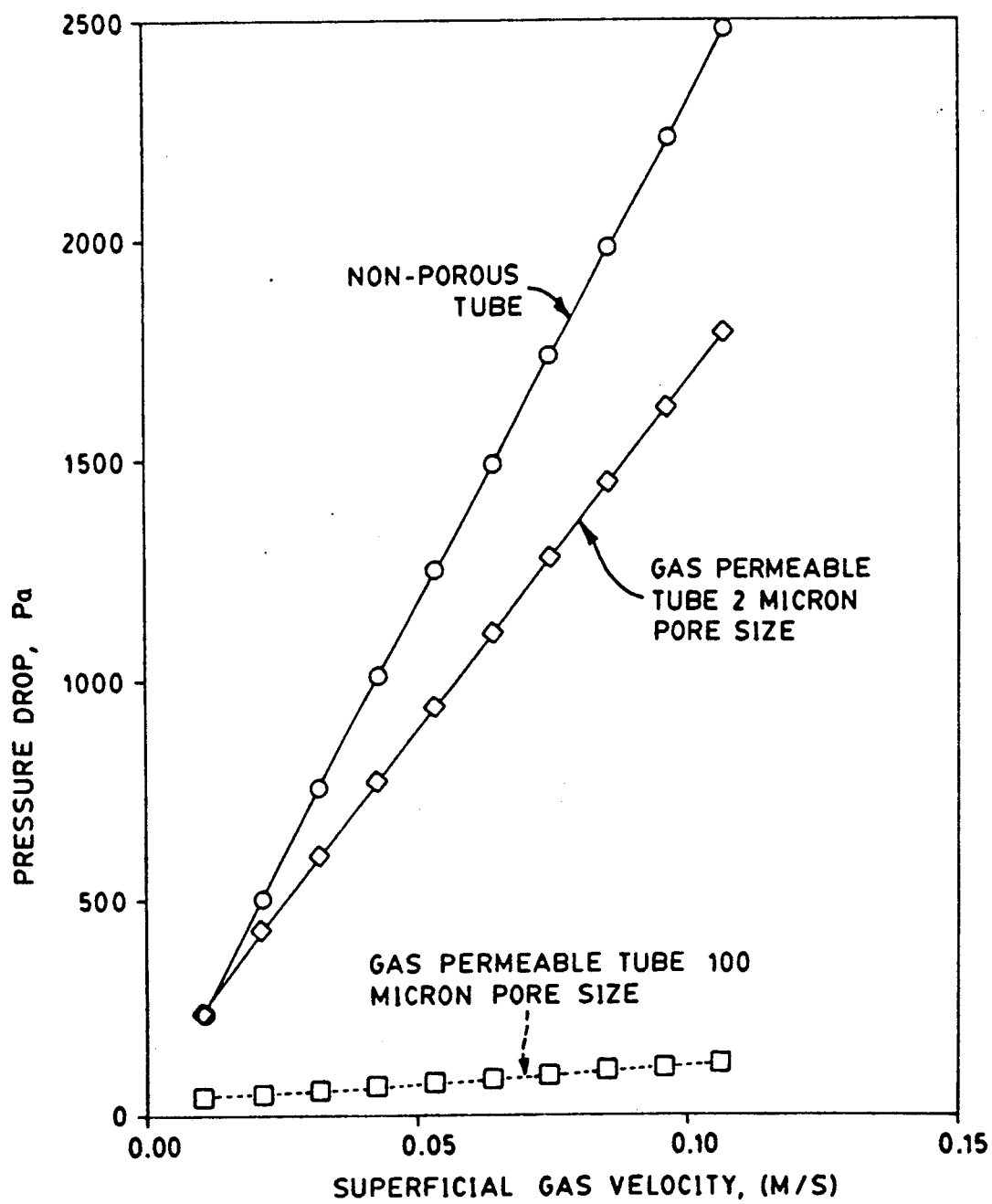
FIG. 2 shows the distributor pressure drop characteristic for the three configurations illustrated, i.e. 1) non gas permeable tube; 2) gas permeable 100 micron tube, and 3) gas permeable 2 micron tube.

FIG. 2 shows the distributor pressure drop vs. superficial gas velocity for all three configurations. The tabular representation of the data is available as columns 2 and 4 in Table 1 and as columns 2 and 3 in both Tables 2 and 3.

TABLE 1

CONFIGURATION 1
PRESSURE DROP AND GAS FLOW DATA:
FLUIDIZATION OF PHOSPHOR WITH 5 MICRON
PLATE AND NONPOROUS TUBE

| Air Flow Rate (SLM) | Gas Vel (M/S) | Total Pr Drop (Pa) | Dist Pr Drop (Pa) | Bed Pr Drop (Pa) | Normalized Bed Pr Drop (%) |
|---|---|---|---|---|---|
| 4.94 | 0.010 | 3010.0 | 243.8 | 2766.2 | 93.16 |
| 10.03 | 0.021 | 3312.5 | 496.1 | 2816.4 | 94.85 |
| 15.04 | 0.032 | 3560.0 | 744.7 | 2815.2 | 94.81 |
| 19.98 | 0.042 | 3787.0 | 989.5 | 2797.4 | 94.21 |
| 25.03 | 0.053 | 4019.7 | 1240.0 | 2779.7 | 93.62 |
| 29.95 | 0.063 | 4250.1 | 1484.4 | 2765.6 | 93.14 |

TABLE 1-continued
CONFIGURATION 1
PRESSURE DROP AND GAS FLOW DATA:
FLUIDIZATION OF PHOSPHOR WITH 5 MICRON
PLATE AND NONPOROUS TUBE

| Air Flow Rate (SLM) | Gas Vel (M/S) | Total Pr Drop (Pa) | Dist Pr Drop (Pa) | Bed Pr Drop (Pa) | Normalized Bed Pr Drop (%) |
|---|---|---|---|---|---|
| 34.95 | 0.074 | 4460.7 | 1732.1 | 2728.5 | 91.89 |
| 39.96 | 0.085 | 4686.6 | 1980.6 | 2705.9 | 91.13 |
| 44.97 | 0.095 | 4896.6 | 2229.4 | 2667.1 | 89.82 |
| 49.95 | 0.106 | 5104.8 | 2476.4 | 2628.4 | 88.52 |

Gas velocity based on empty bed cross sectional area of 78.06E-4m$^2$. Ideal bed pressure drop is 2969.1 Pa.

TABLE 2
CONFIGURATION 2
PRESSURE DROP AND GAS FLOW DATA:
FLUIDIZATION OF PHOSPHOR WITH 5 MICRON
PLATE AND 100 MICRON PORE SIZE TUBE

| Air Flow Rate (SLM) | Gas Vel (M/S) | Dist Pr Drop (Pa) | Total Pr Drop (Pa) | Bed Pr Drop (Pa) | Normalized Bed Pr Drop (%) |
|---|---|---|---|---|---|
| 5.02 | 0.010 | 40.7 | 2829.0 | 2628.6 | 87.75 |
| 10.04 | 0.021 | 49.2 | 2888.8 | 2679.9 | 89.46 |
| 15.08 | 0.032 | 57.7 | 2922.9 | 2705.5 | 90.31 |
| 20.00 | 0.043 | 66.1 | 2916.0 | 2690.2 | 89.80 |
| 25.00 | 0.053 | 74.6 | 2919.6 | 2685.4 | 89.64 |
| 30.02 | 0.064 | 83.1 | 2924.4 | 2681.6 | 89.52 |
| 34.98 | 0.075 | 91.5 | 2891.3 | 2640.0 | 88.13 |
| 39.99 | 0.085 | 100.0 | 2895.7 | 2635.9 | 88.00 |
| 44.97 | 0.096 | 108.5 | 2884.6 | 2616.4 | 87.34 |
| 49.95 | 0.107 | 116.9 | 2910.4 | 2633.8 | 87.92 |

Gas velocity based on empty bed cross sectional area of 78.06E-4m$^2$. Ideal bed pressure drop is 2995.6 Pa.

TABLE 3
CONFIGURATION 3
PRESSURE DROP AND GAS FLOW DATA:
FLUIDIZATION OF PHOSPHOR WITH 5 MICRON
PLATE AND 2 MICRON PORE SIZE TUBE

| Air Flow Rate (SLM) | Gas Vel (M/S) | Dist Pr Drop (Pa) | Total Pr Drop (Pa) | Bed Pr Drop (Pa) | Normalized Bed Pr Drop (%) |
|---|---|---|---|---|---|
| 5.06 | 0.010 | 254.8 | 3091.1 | 2694.7 | 89.93 |
| 10.06 | 0.021 | 425.1 | 3353.8 | 2787.0 | 93.01 |
| 15.02 | 0.032 | 594.0 | 3559.4 | 2823.7 | 94.24 |
| 20.00 | 0.043 | 763.6 | 3693.1 | 2787.8 | 93.04 |
| 25.02 | 0.053 | 934.5 | 3838.3 | 2762.1 | 92.18 |
| 30.03 | 0.064 | 1105.2 | 3969.9 | 2723.1 | 90.88 |
| 35.03 | 0.075 | 1275.4 | 4087.9 | 2670.7 | 89.13 |
| 39.99 | 0.085 | 1444.3 | 4218.9 | 2632.8 | 87.87 |
| 44.99 | 0.096 | 1614.6 | 4358.5 | 2602.2 | 86.84 |
| 49.95 | 0.107 | 1783.5 | 4520.5 | 2595.3 | 86.61 |

Gas velocity based on empty bed cross sectional area of 78.06E-4. Ideal bed pressure drop is 2996.4 Pa.

The superficial gas velocity is the gas velocity in the bed, and is computed by dividing the total gas flow rate by the cross sectional area of the bed. The total gas flow rate is the gas flow rate to the system as regulated by the mass flow controller. Statistical analysis of the date in FIG. 2 shows that a straight line is an excellent fit to the data for all three configurations. In particular, the value of multiple $R^2$ for the linear fits in FIG. 2 for Configurations 1, 2 and 3 are 0.99988, 0.9975 and 0.999, respectively. It follows from the relation between superficial gas velocity and total gas flow rate that a straight line is also an excellent fit to the distributor pressure drop vs total gas flow rate data for all three configurations.

Distribution of Gas Flow in the Absence of Powder

All of the gas fed to the system flows through the distributor plate in Configuration 1, because the tube is non-porous and therefore, non-permeable. We will now determine the distribution of gas between the distributor plate and the distributor tube in Configurations 2 and 3.

It follows from the information presented in the preceding paragraphs that the following linear relationships are valid:

$$\Delta P = K_p Q_p + C_p \quad (1)$$

$$\Delta P = K_o Q_o + C_o \quad (2)$$

K and C refer to the slope and intercept of the line of best fit to the pressure drop vs total gas flow rate data. Suffix p refers to the distributor plate only. In particular, $Q_p$ is the magnitude of the gas flow rate through the distributor plate. Suffix o refers to either of the novel distributor configurations presented in this application, viz., Configurations 2 and 3. In particular, $Q_o$ is the total gas flow rate in either of these two configurations. It follows that $Q_p/Q_o$ is the fraction of the total gas flow rate that passes through the distributor plate. It is very important to know and to be able to control the distribution of gas between the distributor tube and the distributor plate. This distribution directly affects the mobility of solids and their flow pattern in the fluidized bed.

The following relations may be deduced from equations (1) and (2):

$$Q_p = (\Delta P - C_p)/K_p \quad (3)$$

$$Q_o = (\Delta P - C_o)/K_o \quad (4)$$

Using equations (3) and (4), one can obtain the fraction of the total gas that flows through the distributor plate:

$$Q_p/Q_o = (K_o/K_p)(\Delta P - C_p)/(\Delta P - C_o) \quad (5)$$

It follows from equation (5) that the smaller the value of $K_o$ and the larger the value of $K_p$, the smaller is $Q_p/Q_o$ or lower is the fraction of the total gas flow that passes through the distributor plate. A smaller $K_o$ amounts to a shallower slope of the pressure drop characteristic of the novel distributor system: Configurations 1 and 2. A larger $K_p$ amounts to a steeper slope for the pressure drop characteristic of the current state of the art: Configuration 1.

Gas Distribution for Configuration 2 (100 Micron Pore Size Tube)

The slope and intercept of the line of best fit to the pressure drop data in FIG. 2 for Configuration 2 are 795.374 and 32.148, respectively. The corresponding parameters for Configuration 1 are 23240.715 and −1.2667. Although the plots in FIG. 2 have total gas velocity and not total gas flow rate as the abscissa, it follows from the linear relationship between superficial gas velocity and total gas flow rate, that $K_o/K_p$ is numerically equal to the ratio of slopes of the lines of best fit to Configurations 2 and 1 in FIG. 2. Using this information in equation (5), one obtains the relation:

$$Q_p/Q_o = 0.0342 \, (\Delta P + 1.2667)/(\Delta P - 32.148) \quad (6)$$

Figure 3:
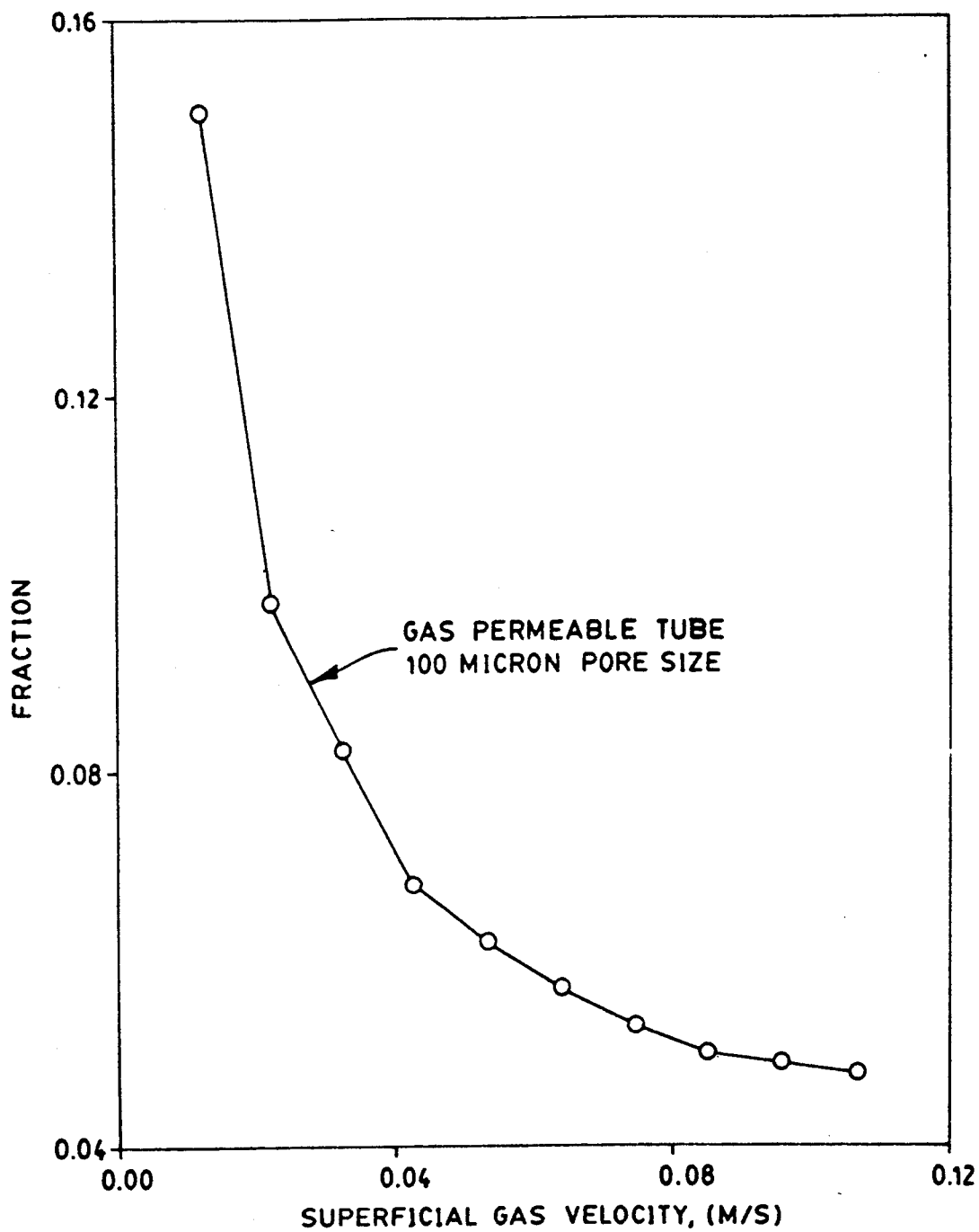
FIG. 3 shows the fraction of gas flow through the distributor plate for Configuration 2 (100 micron tube)

This relationship is plotted in FIG. 3, where the superficial gas velocity corresponding to any ΔP is obtained from the data for Configuration 2 in FIG. 2. Fluid beds of cohesive phosphors are preferably operated at superficial gas velocities between 8 and 10 cm/s. It follows from FIG. 3, that under these conditions, only about 5% of the total gas flows through the distributor plate. The balance of the gas, or about 95% of the total gas, flows through the 100 micron pore size distributor tube.

Gas Distribution for Configuration 3 (2 Micron Pore Size Tube)

The slope and intercept of the line of best fit to the pressure drop data in FIG. 2 for Configuration 3 are 795.374 and 32.148, respectively. The corresponding parameters for Configuration 1 are 23240.715 and −1.2667. Following a reasoning akin to that detailed in the previous section, one obtains the relation:

$$Q_p/Q_o = 0.6865 \, (\Delta P + 1.2667)/(\Delta P - 82.466) \quad (7)$$

Figure 4:
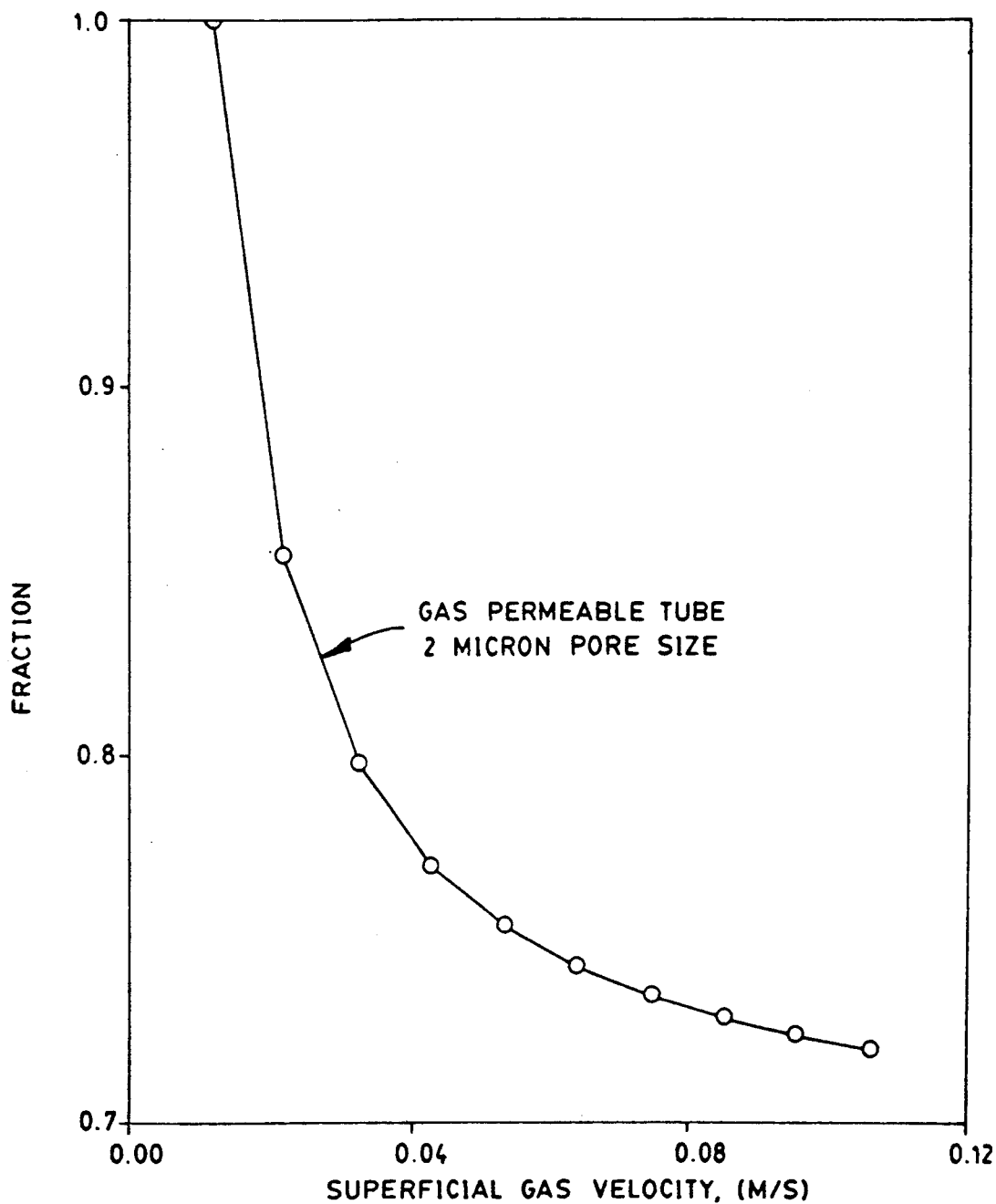
FIG. 4 shows the fraction of gas flow through the distributor plate for Configuration 3 (2 micron tube)

A graphical representation of equation (7) is shown in FIG. 4. Fluid beds of cohesive phosphors are preferably operated at superficial gas velocities between 8 and 10 cm/s. It follows from FIG. 4 that under these conditions about 72 to 73% of the total gas flows through the distributor plate. The balance of the gas, or about 27 to 28% of the total gas, flows through the 2 micron pore size distributor tube.

Gas Distribution During Powder Fluidization

The previous analysis considered an empty system: in particular, there was no powder in the fluid bed. When the system is charged with phosphor, some of the powder makes its way to the tube. An experiment was devised to investigate the influence of the tube solids on the distribution of gas between the tube and the plate. In particular, the aim was to find out if the presence of tube solids had any significant effect in reducing the proportion of total gas that flows through the distributor tube during powder fluidization.

The approach adopted was to add powder to the system, so as to fill only the tube volume at the beginning of the run. The distributor pressure drop was measured and compared with that in the absence of powder in the tube. For Configuration 2 (100 micron pore size tube), the additional pressure drop caused by the powder in the tube was 160±23 Pa, over the complete range of gas flow rates. The additional pressure drop realized in Configuration 3 (2 micron pore size tube) was 142±19 Pa, over the complete range of gas flow. When powder is charged to the whole system, and not just the tube, the typical pressure drop incurred by the gas due to contact with solids both in the tube and the bed above it is about 2800 Pa. The pressure drop due to the solids in the tube is, therefore, only about 5% of the overall pressure drop incurred by the gas in the course of its passage through the total solids inventory of the system. It may, therefore, be concluded that during the operation of the fluid bed, the average pressure inside the porous permeable tube is not substantially higher than the pressure existing just above the porous plate. It follows, therefore, that the distribution of gas between the plate and the tube, during powder fluidization, is not significantly different from the distribution in the absence of any powder in the system.

Total Pressure Drop During Powder Fluidization

Figure 5:
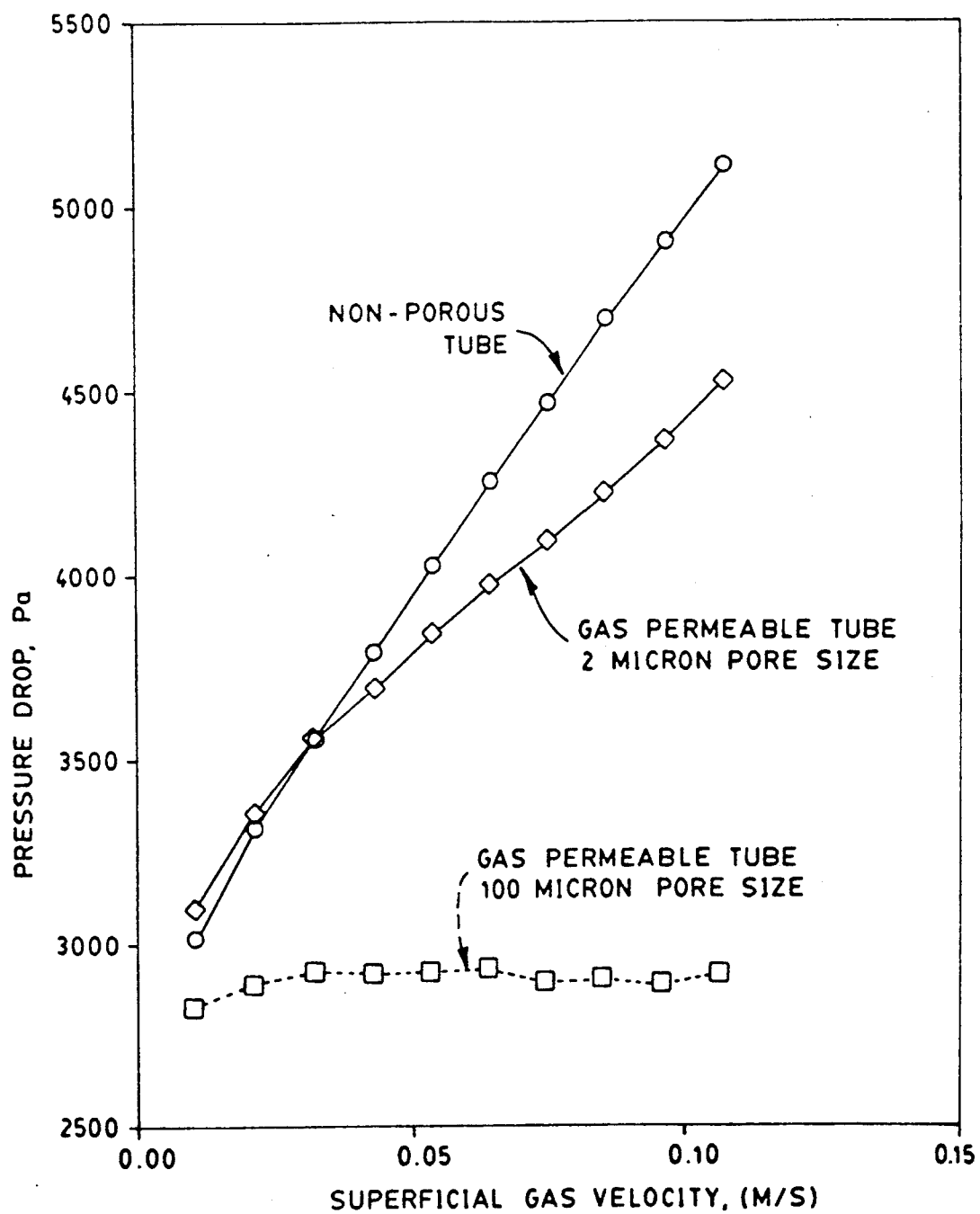
FIG. 5 shows the total pressure drop during fluidization for all three configurations.

FIG. 5 shows the total pressure drop measured as a function of superficial gas velocity, during the fluidization of phosphor. A tabular representation of the data is available as columns 2 and 3 in Table 1 and as columns 2 and 4 in Tables 2 and 3. The total pressure drop is given by the summation of the distributor pressure drop, the pressure drop due to the tube solids and the pressure drop due to the bed solids (bed pressure drop). The total pressure drop was measured with an identical amount of feed powder (2.313 kg) in the system for each configuration. In addition, the total gas flow rate was increased in an identical fashion in all three configurations.

Normalized Bed Pressure Drop During Powder Fluidization

Configuration 1 (Non-porous Tube)

In Configuration 1, there is no flow of gas through the solids in the tube since the tube is non-porous. There is, therefore, no pressure drop associated with the tube solids. It follows, therefore, that the bed pressure drop for Configuration 1 may be found by subtracting the distributor pressure drop from the total pressure drop. The latter is obtained from the data in FIG. 5, while the former is obtained as a result of the linear fit to the data in FIG. 2. The bed pressure drop, calculated in this manner, is tabulated as column 5 in Table 1.

The normalized bed pressure drop is defined as the ratio of the bed pressure drop, computed by the technique just described, to the ideal bed pressure drop. It is customary to express this ratio as a percentage. The ideal bed pressure drop is defined as the weight of bed solids per unit of bed cross-sectional area. The mass of powder initially fed to the system is distributed between the bed and the tube. This distribution needs to be known to calculate the ideal bed pressure drop. The distribution may be computed by the following iterative procedure which displays rapid mathematical convergence.

It is initially assumed that the total feed solids inventory is in the bed. Knowing the bed cross-sectional area and the expanded bed height, the first estimate of the expanded solids density is obtained. This density and a knowledge of the tube volume yields the first estimate of the tube solids inventory. A second estimate of the expanded solids density is obtained by using a revised estimate for the bed solids: total feed solids—first estimate for tube solids inventory. This yields a second iteration value for the tube solids mass. This process is continued till there is no significant difference between successive iterations. The final value of tube solids inventory, obtained as a result of this iterative process, is accepted as the mass of solids in the tube during the fluidization process. The bed solids mass is easily computed by subtracting the tube solids mass from the mass of powder initially charged to the system. The ideal bed pressure drop is then calculated by the relationship mentioned in the previous paragraph.

Figure 6:
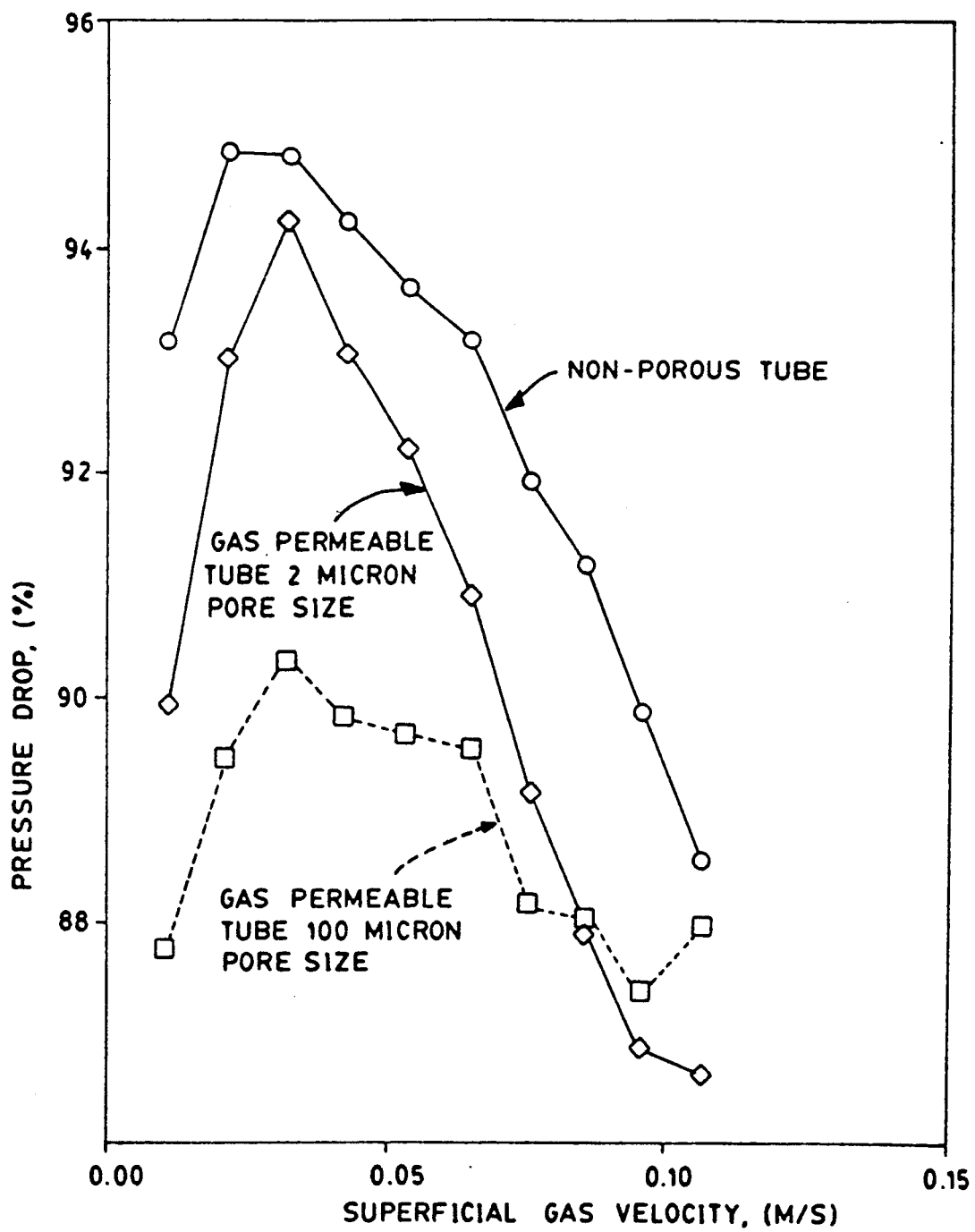
FIG. 6 shows the normalized bed pressure drop during fluidization for all three configurations.

Using the procedure outlined in this section, one obtains the tube solids inventory as being 50.4 g, and the ideal bed pressure drop as being 2969.1 Pa. The normalized bed pressure drop, defined earlier in this section, is expressed both in column 6 of Table 1 and in graphical form in FIG. 6. It is observed that in the domain of superficial gas velocities used for fluidization of cohesive powders, the normalized bed pressure drop is between 88.5 and 91%.

Configuration 2 (100 Micron Pore Size Tube)

It has been proven in an earlier section that in Configuration 2, there is flow of gas through the solids in the tube. There is, therefore, a pressure drop associated with this motion. This pressure drop, in addition to the usual distributor pressure drop, has to be subtracted from the total pressure drop to obtain the bed pressure drop. It has been explained in the section on Gas Distribution that for Configuration 2 (100 micron pore size tube), the additional average pressure drop caused by the powder in the tube is 160 Pa, over the complete range of gas flow rates.

Using a procedure akin to that outlined in the previous section, one finds that the tube solids mass is 29.35 g and the ideal bed pressure drop is 2995.6 Pa. The normalized bed pressure drop is expressed both in column 6 of Table 2 and in graphical form in FIG. 6. It is observed that in the domain of superficial gas velocities used for fluidization of cohesive powders, the normalized bed pressure drop is between 87.3 and 88%.

Configuration 3 (2 Micron Pore Size Tube)

It has been proven in an earlier section that in Configuration 3, there is flow of gas through the solids in the tube. There is, therefore, a pressure drop associated with this motion. This pressure drop, in addition to the usual distributor pressure drop, has to be subtracted from the total pressure drop to obtain the bed pressure drop. It has been explained in the section on Gas Distribution that for Configuration 3 (2 micron pore size tube), the additional average pressure drop caused by the powder in the tube is 142 Pa, over the complete range of gas flow rates.

Using a procedure akin to that outlined in the previous section, one finds that the tube solids mass is 28.7 g and the ideal bed pressure drop is 2996.4 Pa. The normalized bed pressure drop is expressed both in column 6 of Table 3 and in graphical form in FIG. 6. It is observed that in the domain of superficial gas velocities used for fluidization of cohesive powders, the normalized bed pressure drop is between 86.6 and 87.9%.

Bed Expansion During Powder Fluidization

Figure 7:
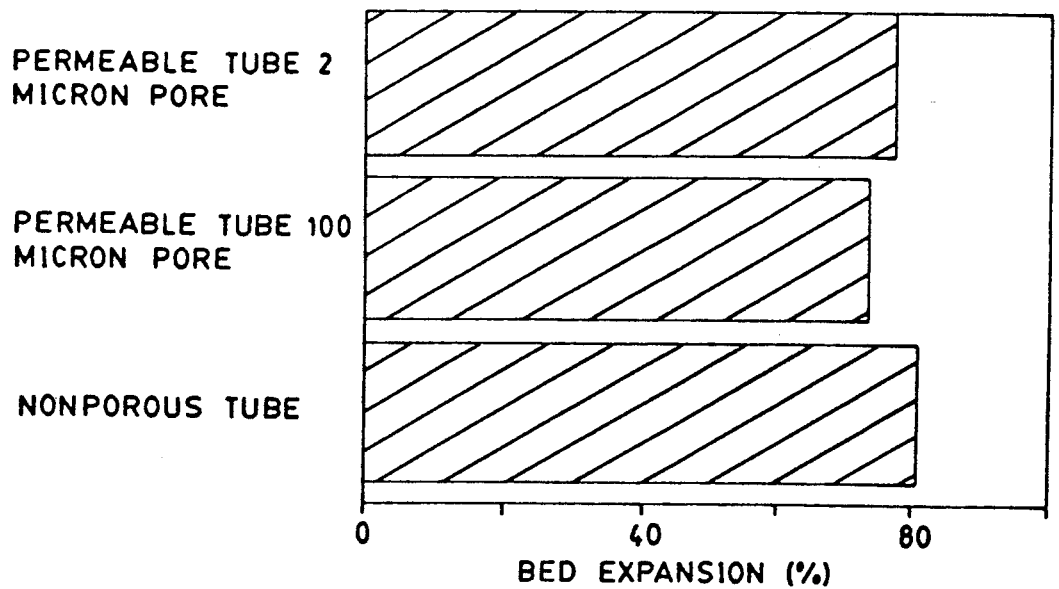
FIG. 7 shows the bed expansion during fluidization for all three configurations.

The bed expansion for all three configurations, at the highest superficial gas velocity, is shown in FIG. 7. Bed expansion is defined as the ratio of the increase in bed height upon fluidization, to the original bed height before fluidization. It is customary to express this expansion as a percentage. It is observed in FIG. 7 that the maximum bed expansion changes from 80.95% for the non-porous tube to 77.35% for the 2 micron pore size tube configuration and 73.5% for the 100 micron pore size tube system.

Bed Drainage Characteristics

Figure 8:
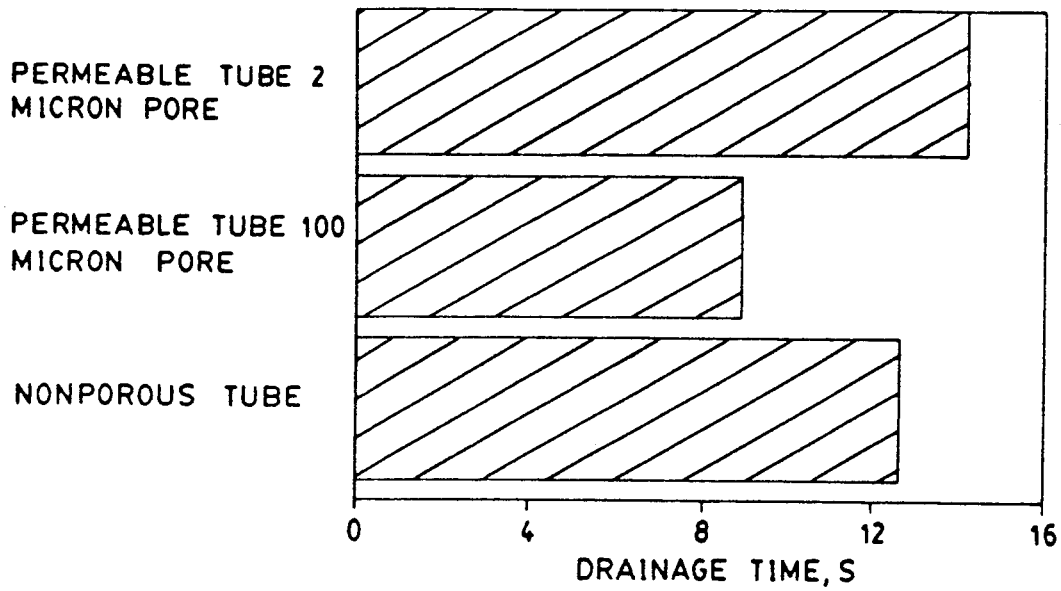
FIG. 8 shows the bed drainage time for all three configurations.

An identical amount of powder (2.313 kg) was fed to the system in each of the three configurations. The total gas flow rate was controlled at the maximum, to obtain the highest superficial gas velocity. After steady state bed expansion had been realized, the plug at the bottom of the tube was removed rapidly. The gas flow to the system was maintained during the entire period of solids withdrawal. The time taken for the bed to drain out was noted for three independent runs at each configuration. FIG. 8 shows the mean of the bed drainage times for all three configurations. Table 4 is a tabular representation of the mean and standard deviation of the bed drainage times.

It is clear that the 100 micron pore size tube displays the fastest bed drainage characteristics. The drainage time of 8.9 s is about 70% of that for the current state of the art, 12.6 s. This is a significant improvement in powder drainage rate, from a fluid bed, compared to the current state of the art. In addition, the 100 micron pore size tube also exhibits very smooth powder drainage with no sudden stoppages in flow due to bridging problems.

It is believed that the slower bed drainage of the 2 micron pore size gas permeable tube as compared to the non-permeable tube was due to the rougher inside surface of the 2 micron pore size tube. Surface roughness was measured on the inner tube surfaces. The diamond tipped stylus used for the profilometry had a radius of 2.5 um. The trace was performed over a span of 5 mm in a direction parallel to the tube axis. The non-permeable tube had an average roughness of 37,365 A°, while the average roughness of the 2 micron tube was 58,919 A°. The 2 micron tube was definitely rougher, accounting for the slower drainage.

The 2 micron pore size tube allows about 27% of the total gas to flow through the tube, a fraction much smaller than the 95% allowed in the 100 micron pore size tube. Although the 2 micron pore size tube allows the flow of gas through itself while the non-permeable tube does not, the small fraction of gas flowing through the tube in the former case is not sufficient to overcome the increased resistance to solids flow due to the extra wall friction in the 2 micron pore size tube as compared to the non-permeable tube. Both the 2 and 100 micron pore size tubes are rougher than the non-permeable tube because the former are made by a sintering process as compared to a machining process for the latter. While the very large gas flow through the 100 micron pore size tube easily overcomes the added resistance due to surface roughness, the low gas flow in the 2 micron tube is not sufficient to realize a gain in solids withdrawal rate as compared to the current state of the art.

The distribution of gas between the tube and the plate was defined earlier in Equation 5 of this application. This distribution depends on the permeabilities of these two members and their effective surface areas. It is desired that these be selected such that at least 60% of the total gas fed to the plenum enters the fluid bed via the permeable tube. More preferably, at least about 85% of the total gas should enter the fluid bed via the tube.

TABLE 4

| Fluidized Bed Drainage Times | | |
|---|---|---|
| Gas Permeable Tube Pore Size (Microns) | Bed Drainage Time (S) | Std. Dev. of Bed Drainage Time (S) |
| Non-Porous Tube | 12.6 | 0.4 |
| 100 | 8.9 | 0.2 |
| 2 | 14.1 | 0.1 |

Withdrawal of product from fluidized beds is problematic when the powder is cohesive. Lamp phosphors fall into the class of cohesive materials. A system like the current state of the art has at least one of the following two disadvantages: slow product drainage rate and abrupt stoppages in product drainage due to phenomena like bridging. This invention makes significant improvement in the bed drainage characteristics of cohesive powders, while simultaneously enhancing the degree of fluid bed activity. The invention is also flexible in that various circulation patterns of solids may be realized by suitable embodiments of the invention. These advantages over the current state of the art are achieved at minimum expense as regards normalized bed pressure drop and bed expansion.

Table 5 compares the proposed invention with the current state of the art, the comparison being made with respect to four process parameters. The parameters are bed drainage time, bed activity level, bed pressure drop and bed expansion. The preferred embodiment of the invention is the 100 micron tube system shown in column 2. It is clear that this distributor achieves bed drainage in 70% of the time needed by the conventional distributor shown in column 1. The discharge is also a very smooth one and is not characterized by abrupt stoppages in flow.

Another attractive feature of this invention is that the level of bed activity is significantly higher, by at least a factor of two, with the 100 micron tube distributor than with the current state of the art distributor. The measure of bed activity used in Table 5 is the ratio of the standard deviation of the total pressure drop to the mean total pressure drop. It is customary to express this ratio as a percentage. Enhancement of the level of bed activity for fluid beds of cohesive powders is on the wish list of practitioners in the part. This invention now makes that possible.

These significant advantages provided by the invention are achieved with minimal loss in the normalized bed pressure drop and the bed expansion. In particular, the former process parameter with the 100 micron tube is only 2.3% lower than that with the current state of the art. Furthermore, the decrease in bed expansion with the 100 micron distributor, compared to that with the current state of the art, is less than 10%.

TABLE 5

| Summary of Process Characteristics | | | |
|---|---|---|---|
| Process Characteristic | Non-Porous Tube | 100 Micron Tube | 2 Micron Tube |
| Bed Drainage Time (S) | 12.6 | 8.9 | 14.1 |
| Degree of Bed Activity (%) | 1.28 | 5.96 | 2.06 |
| Normalized Bed Pressure Drop (%) | 89.8 | 87.75 | 87.1 |
| Maximum Bed Expansion (%) | 80.95 | 73.5 | 77.35 |

While there have been shown and described what are at present considered to be the preferred embodiments of the invention, it will be apparent to those skilled in the art that various changes and modifications can be made herein without departing from the scope of the invention. Therefore, the aim in the appended claims is to cover all such changes and modifications as fall within the true spirit and scope of the invention. The actual scope of the invention is intended to be defined in the following claims when viewed in their proper perspective based on the prior art.

What is claimed is:

1. A method of fluidizing particles in a vertically extending bed of particles comprising:
   introducing upwardly flowing gases into a bottom portion of the bed for fluidizing the particles;
   distributing one portion of said upwardly flowin gas under pressure into the bottom portion of said bed through a gas permeable member extending in a direction transverse to said vertically extending bed,
   distributing another portion of said upwardly flowing gas under pressure into the bottom portion of said bed through the central opening of a conduit, said conduit having a gas permeable wall for the flow of gas into the central opening,
   said gas permeable member and said gas permeable wall each having a plurality of pores interconnecting opposing surfaces wherein said pores extend substantially over the entirety of said surfaces,
   selecting said distribution through said one portion and said other portion for moving particles in said bed,
   connecting a valve to said conduit means for controlling the flow of particles from said conduit and being in a normally closed position for preventing the discharge of particles from said bed during fluidization, and
   discharging particles from said bed through the central opening of said conduit when said value means is in an open position and while flowing gas into said conduit through said gas permeable wall.

2. A method of fluidizing particles in a fluidized bed according to claim 1 wherein said bed is confined within an elongated vessel, said vessel having a vertically oriented interior side wall wherein said gas permeable member extends away from said side wall in a direction transverse to said side wall.

3. A method of fluidizing particles in a fluidized bed according to claim 2 wherein said valve means is spaced from said vessel whereby said conduit contains particles during fluidization of said bed.

4. A method of fluidizing particles in a fluidized bed according to claim 3 including a source of gas under pressure, said gas permeable member and said gas permeable wall of said conduit being in communication with said source of gas for the flow of gas into said bed during fluidization of said bed.

5. A method of fluidizing particles in a fluidized bed according to claim 4 wherein said conduit has a tubular shape and a vertically oriented axis, said bed and said conduit extend along said vertically oriented axis.

6. A method of fluidizing particles in a fluidized bed according to claim 4 wherein a major portion of said gas flows through said conduit during fluidization of said bed.

7. A method of fluidizing particles in a fluidization bed according to claim 6 wherein at least about 60 percent of said gas flows through said conduit during fluidization of said bed.

8. A method of fluidizing particles in a fluidized bed according to claim 7 wherein at least about 85 percent of said gas flows through said conduit during fluidization of said bed.

9. A method of fluidizing particles in a fluidized bed according to claim 4 wherein said source of gas under pressure is operable at different pressures.

10. A method of fluidizing particles in a fluidized bed according to claim 9 wherein said fluidization of said bed is carried out at one pressure and said discharging is carried out at another pressure.

11. A method of fluidizing particles in a fluidized bed according to claim 10 wherein said other pressure is lower than said one pressure and sufficient for increasing the flowability of said powder during discharging.

12. A method of fluidizing particles in a fluidized bed according to claim 4 wherein said bottom portion slopes upwardly from said conduit to said side wall.

13. A method of fluidizing particles in a fluidized bed according to claim 12 wherein said source of gas under pressure is operable at a different pressures.

14. A method of fluidizing particles in a fluidized bed according to claim 12 wherein said fluidization of said bed is carried out at one pressure and said discharging is carried out at another pressure.

15. A method of fluidizing particles in a fluidized bed according to claim 14 wherein said other pressure is lower than said one pressure and sufficient for increasing the flowability of said powder during discharging.

* * * * *